Jan. 14, 1936.　　　　F. R. FORTIER　　　　2,027,422
METHOD OF CLARIFYING SUGAR CANE JUICES
Filed Sept. 7, 1934
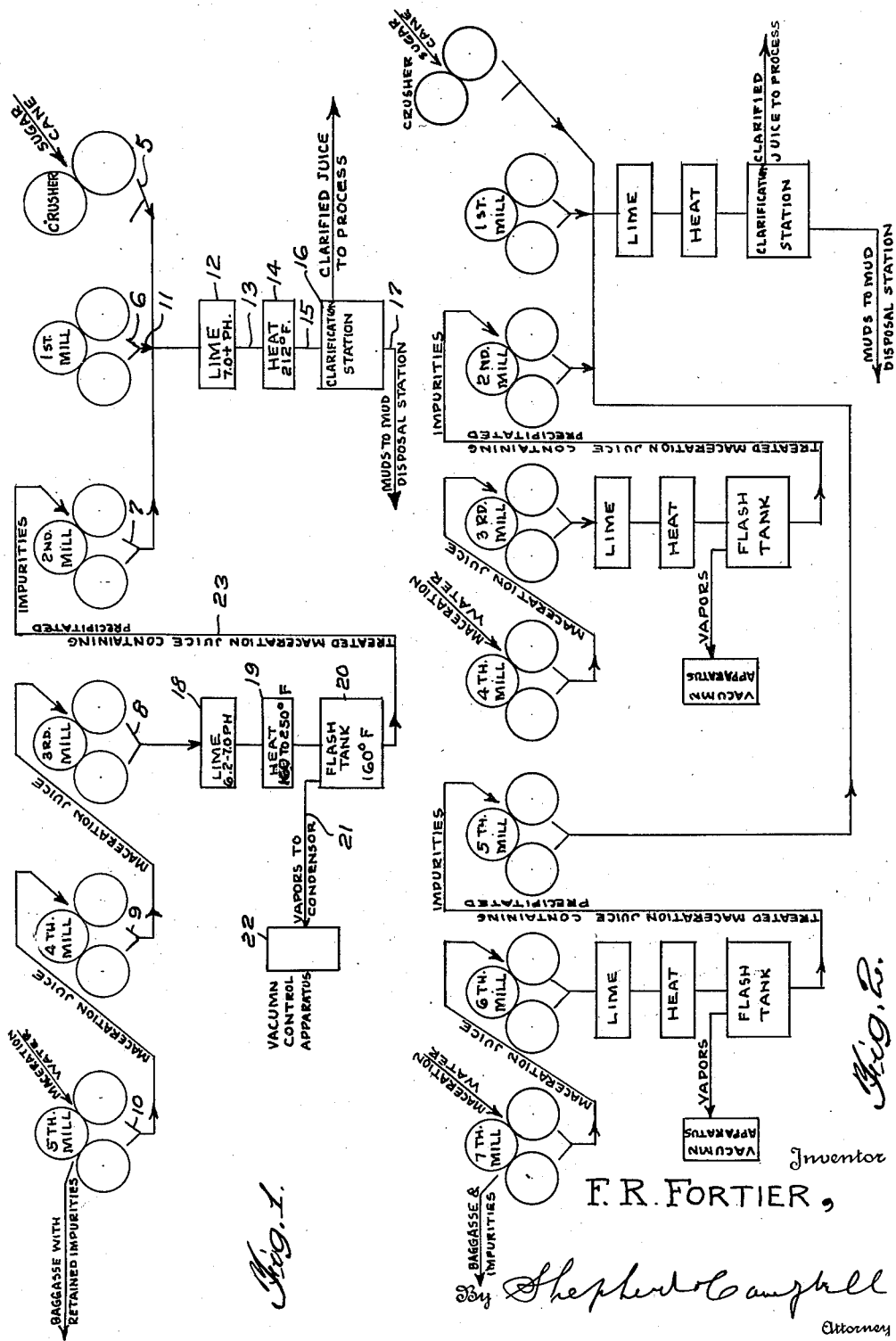

Patented Jan. 14, 1936

2,027,422

UNITED STATES PATENT OFFICE 2,027,422

METHOD OF CLARIFYING SUGAR CANE JUICES

Francis Rivers Fortier, Jeanerette, La., assignor of one-fifth to Frank G. Campbell, Arlington County, Va.

Application September 7, 1934, Serial No. 743,140
In Cuba September 4, 1934

6 Claims. (Cl. 127—43)

This invention relates to a method of and a means for effecting the clarification of juices, and in particular for effecting the clarification of the sugar cane juices extracted from sugar cane.

The object of the invention is to provide a method and means of the character indicated through which clarification may be effected in a very rapid and economical manner. One of the important features of the invention resides in utilizing the bagasse, constituting the residue from the cane crushing and juice extracting operations, as a filtering medium, in a new way. Modern sugar mills comprise a group of crushing and macerating units through which the cane to be crushed is successively passed. The juice which comes from the first of these mills, and which I may term the primary juice, is the clearest and least laden with impurities, while the juices which are collected from the latter units are those extracted under heavy pressure and macerated in the presence of added liquid. This is secondary, low grade juice which is heavily laden with impurities.

In this invention, this secondary juice is suitable treated (either chemically or with heat or both) to precipitate the precipitatable impurities, and is then discharged, (without decantation) upon the bagasse mat at a point to pass through said mat and to be thereafter added to and collected with the primary juices. The described chemical or heat treatment so consolidates the impurities as to permit the bagasse mat to act as a strainer to remove most of the heavy impurities so that by the time these secondary juices are added to the primary juices, they are in about just as good condition, as far as freedom from precipitatable impurities is concerned, as the primary juices themselves. Under these conditions I find it possible to consummate highly effective clarification with the use of only one clarifying unit, where with other processes of compound clarification, it has been necessary to employ one clarifier for the primary juices and another clarifier for the secondary juices.

The invention further contemplates the treatment of the secondary juices or primary juices or both, with lime or other chemical and, or, heat, as hereinafter described; and when the secondary juices are so treated, they are delivered to the bagasse mat at relatively high temperatures, these high temperatures not only aiding in releasing juices from the sugar cane, but they tend to effect such sterilization of the mechanism of the sugar cane mills as to prevent undesirable fermentation of the particles of bagasse and the sugar juices left thereon.

The use of this process gives highly advantageous results from the standpoint of yield, while requiring a greatly reduced investment. Further, in this improved process, the juices are in process such a short time as to eliminate the inversion of the acid juices which occurs when the processing is continued for too long a time.

The reason that this process gives such a greatly increased yield with a markedly reduced investment will be better understood from a consideration of the following facts.

Raw cane juice contains among its precipitable impurities albumen and phosphates along with complex organic substances. By the use of heat alone (heating to 212 degrees plus) it is possible to precipitate about 70% of the impurities that can be precipitated by lime and heat. Lime enters into chemical combination with the soluble phosphates and many organic impurities to form insoluble precipitates. This juice containing the precipitate is ordinarily allowed to settle over a period of two to three hours and the clear juice decanted and the muds further processed. This is termed clarification. It has been proven by the U. S. Bureau of Chemistry that by heating cane juice in a slightly acid state that a greater amount of colloidal impurities are precipitated than in heating in a neutral or alkaline state. The obstacle to clarifying all the juice in an acid state is due to the higher inversion in an acid medium. As the primary juices contain the bulk of the albumens, phosphates and glucose impurities and little colloidal impurities, and the secondary juices, due to repeated crushing and maceration, contain mainly impurities of a colloidal nature, ground from the disintegrated cane fiber, it becomes obvious that the primary juices should be clarified in an alkaline medium and the secondary in an acid medium. This is substantially what happens in some of the present widely used compound clarification processes. There are two main objections to these known processes of compound clarification, namely:

1st; The cost of the additional clarifier, and
2nd; The time element of two to three hours settling time of the acid juices in such secondary clarifier.

By eliminating the second clarifier I eliminate much of the time required in settling. The added investment in a secondary clarifier represents an additional cost in clarification equipment over my equipment of fully 1500%. Further, the time in process of the secondary juices where the secondary clarifier is used is the time required for gravity settling, namely, between two and three hours. Comparing this with the time in process of the juice under my invention and we have a time difference of 6000%. It is an unquestioned fact in the sugar industry that the inversion or destruction of sugar in cane juices being processed is directly proportional to temperature and time. An important feature of my invention resides in the use of relatively high heating to effect quick precipitation and the subsequent quick cooling to render it possible to return all of the juices to the mills. It is impossible to mill a blanket of bagasse if we discharge thereon excessively hot juices because modern sugar mill crushing units operate under hydraulic pressures of 1,000,000 pounds plus per crusher and the heat caused by friction is already a constant worry and source of trouble. In this heat were augmented by adding very hot juices to the bagasse blanket, the milling problem would be an impossible one.

While the invention described in this application discloses the thought of heating to and above the boiling point, it is a fact that a lesser degree of heating will give some precipitation and if one were satisfied with an imperfect job, such reduced heating might be employed. Therefore, I wish to make it clear that the gist of the invention resides in effecting quick precipitation by relatively high heat with a following quick and substantial reduction in temperature to such a point as to render it practicable to restore the juices almost immediately, and in a continuous operation to the bagassee blanket, and this irrespective of the particular degrees of heat employed.

Two forms of the invention are shown in the accompanying drawing. Figure 1 illustrates a five unit sugar cane mill in which the treated secondary juices are returned upon the bagasse mat, and Figure 2 illustrates a seven unit mill in which the secondary juices from two separate points are treated and returned to the bagasse mat as hereinafter described. However, there are so many ways which would readily suggest themselves to the engineer skilled in the art, of carrying out my improved process, that it is not feasible to attempt to illustrate all of them. Therefore it is to be understood that the invention includes within its purview any process of clarifying liquids extracted from a substance which leaves a porous mass as a residue wherein the liquids extracted are returned to, and strained through said mat, after precipitation and prior to decantation. Further, while I have illustrated liquids to be strained as being passed through the residue only once, it is clear that it would be a mere duplication of this idea to pass them through the mat more than once for further straining, before finally collecting them, if desired.

Since the bagasse from sugar mills is commonly conducted to and burned in the furnaces of the plant, it follows that under my proposal a large amount of removed impurities will automatically be carried to the furnaces and gotten rid of, instead of having to be taken care of in the muds discharged from the clarifier.

It will be readily understood from an inspection of Figure 1 of the drawing that the sugar cane is fed into the crusher indicated at the right hand end of the apparatus, any juice released by the crushing operation being collected in trough 5. Any juice extracted from the mat of cane as it passes through the first mill is collected in trough 6. In like manner juices extracted from the second mill are collected in trough 7. Juices flowing from the third mill are collected in trough 8, juices flowing from the fourth mill are collected in trough 9, and juices flowing from the fifth mill are collected in trough 10.

The troughs 5, 6, and 7 deliver through a common pipe, as indicated at 11 to a receptacle 12, in which said juices are treated with lime in the usual and well-known way. These juices are then delivered through pipe 13 to a heating unit 14 and then delivered through a pipe 15 to clarification unit 16. This may be a Dorr clarifier or a clarifier such as is illustrated in my application, Patent #2,022,661 of December 3, 1935. The muds from this clarifying unit are conducted through conduit 17 to a filter press or any other suitable mud disposal station.

Maceration water may be delivered to the fifth mill and the juices from the fifth mill may be delivered as maceration juice to the fourth mill. In like manner the juices collected from the trough 9 in the fourth mill may be delievered as maceration juice to the third mill. The juices from the third mill are delivered from trough 8 to the receptacle 18, where these secondary juices are chemically treated (by lime, for example) and then conducted to a heating unit 19. The heated and treated juices from unit 19 are delievered to a flash tank 20 that is connected by conduit 21 to vacuum control apparatus 22.

This vacuum treatment could be accomplished by flashing to a jet condenser in which raw juice from the primary mill is used as the condensing medium thereby conserving all the heat, or it may be flashed to the vapor space of any one of the several juice evaporator cells in a multiple evaporator. The majority of factories have what are termed quadruple juice evaporators. The clarified juice enters the first cell and progressively passes to all four cells, being partly evaporated in each cell. To the last cell is attached a condensing means to condense the final vapor which passes over at about 140 degrees F. It can be seen that having a selection of any of these four cells to flash to, that we have four possible temperatures at which to reduce the treated maceration juice. This temperature fall from about 215 degrees to about 140 degrees F. is theoretically equally divided between whatever number of cells are in the evaporator. Since there are so many ways of subjecting these secondary juices to vacuum treatment, I do not attempt to illustrate all of them. It suffices to say that I may vacuum treat these secondary juices, and that I may utilize the conventional juice evaporators found as conventional apparatus in sugar factories, for this purpose, if desired.

From the flash tank 20 the treated maceration juice containing impurities, but impurities which have been precipitated, are delivered through conduit 23 to the next mill, (in this case, the second mill), extracting the primary juices. By the primary juices I mean those which are conducted directly from the point of collection to the primary treating apparatus consisting of the elements 12, 14, and 16, or any of them.

It is believed that from the foregoing description, the operation proposed in Figure 2 will also be readily understood, the essential difference being that in the long tandem mill of Figure 2, treated maceration juice containing precipitated non-decanted impurities is returned to the bagasse mat at two points, namely, at the second mill and at the fifth mill. However, I again wish to impress that the invention is not limited to returning this secondary juice at any particular mill, the invention residing rather in the broad thought of utilizing the bagasse mat in the manner described.

It will of course be understood that the treatment with lime and heat precipitates the impurities in the secondary juices in a usual and known way. The vacuum treatment quickly lowers the temperature of the treated secondary juice to permit its application as treated maceration juice upon one of the mills of the primary juice extracting means, as for example, the second mill of Figure 1, and the second and fifth mills of Figure 2. The treating under a vacuum of the secondary juices permits a wide range of temperatures at which the secondary juice may be treated and applied to the mill units and the bagasse mat.

The invention is not limited to any specific method of treatment for effecting precipitation of the impurities of either the primary or the secondary juices. It is common practice in the sugar world to lime the juice first and then heat it to get precipitation. It is also common to heat the juice first and then lime it. I contemplate doing any of these things. Further it is within the scope of the invention to conduct the treated secondary juices directly from the heater to a point above the bagasse mat without the intermediate step of vacuum treatment, if found desirable.

From the foregoing description it will be seen that the method disclosed, possesses marked advantages from the standpoint of economy, ease of operation, maintenance of sanitary conditions about the sugar mill mechanism, speed of operation, prevention of inversion of the acid juices, and increased yield.

Under my process I am making the bagasse mat perform a considerable part of the work heretofore imposed upon the clarifiers. As a result, I not only eliminate the use of one clarifier in a double defacation process, but I, in substance, increase the capacity of the single clarifier that is employed, by decreasing the amount of solids which it must handle.

I am aware of the fact that it is not broadly new to return sugar cane muds to the bagasse blanket or mat. However, as far as I am aware I am the first to treat the secondary juices to effect a quick precipitation and without decantation in a clarifier, and to return these secondary juices with the precipitated impurities to the bagasse mat. Further, since the precipitation of impurities in cane juice by lime and heat requires 180 degrees F. temperature, preferably more, and as this temperature is concededly too high for the use of the juice as a maceration juice, (because it heats the mill journals), the vacuum treatment or temperature reduction feature is of considerable importance, and new in the sugar industry.

While the vacuum treatment for effecting rapid temperature reduction offers a very effective way of securing the desired results, I wish it to be understood that any means of rapidly effecting temperature reduction is within the purview of the invention, the invention residing in the thought of effecting rapid temperature reduction at this stage of the process, irrespective of the particular mechanical means employed for securing such reduction of temperature.

Further, I am aware that others have proposed to return secondary clarified juice, free of muds, to the mills for its macerating benefit, and of course it ordinarily finds its way to the bagasse mat. However, this is not the equivalent of my process, because such procedure involves the passage of the secondary juices through a clarifier for decantation. This not only involves the expense of a second clarifier, but greatly increases the time of the cycle of operation.

Having described my invention, what I claim is:

1. A process of the character described comprising the steps of collecting the primary juices from sugar cane mills into one apparatus, collecting the secondary juices from said mill into a secondary apparatus, subjecting said secondary juices to a treatment to effect quick precipitation, which treatment involves heating to a relatively high temperature and without decantation, quickly reducing the temperature of said secondary juices and delivering them with their precipitated and consolidated impurities back to and upon the bagasse mat and collecting said secondary juices for further clarification after they have been strained by passage through said mat, all in a continuous operation.

2. A process of the character described comprising the steps of collecting the primary juices from sugar cane, collecting the secondary juices from said cane, subjecting said secondary juices to a treatment to effect quick precipitation without decantation, which treatment involves the heating of said secondary juices to a temperature of 212° plus, quickly reducing the temperature of said juices by at least 20° and delivering said secondary juices directly from said treatment along with their precipitated and consolidated impurities back to and upon the bagasse mat at such a point that after its passage through the mat and its straining by said mat, the secondary juices are mixed with the primary juices preparatory to the clarification of the whole.

3. A process of the character described comprising the step of subjecting sugar cane juices to a treatment to effect clear precipitation without decantation, which treatment includes the heating of said juices to a point materially higher than the temperature that is practical for macerating juices, quickly reducing the temperature of said juices and delivering them directly from said treatment and in a continuing operation to and upon the bagasse mat of a mill from which said juices were originally derived to cause said mat to function as a filtering medium for the same.

4. A process of the character described comprising the step of collecting the primary juices from sugar cane in one apparatus, collecting the secondary juices from said cane in a secondary apparatus, subjecting said secondary juices to a treatment to effect quick precipitation without decantation which treatment includes subjecting said juices to lime and heat until the temperature of said juices is in excess of 212°, vacuum treating to quickly reduce the temperature of the juices to such a point as to render the said juices practical for macerating purposes and then returning said juices back to and upon the bagasse mat at such a point that after they have passed through the said bagasse mat they are mixed with the primary juices.

5. A process of the character described comprising the steps of collecting the primary juices from sugar cane mills into one apparatus and there decanting them, collecting the secondary juices from said mill into a secondary apparatus and there subjecting said secondary juices to a treatment to effect quick precipitation without decantation and then delivering the whole of said secondary juices along with their precipitated and consolidated impurities back to and upon the bagasse mat of the mill at such a point that said juices after being strained through said bagasse mat join the primary juices to be subjected to the step of decantation along with said primary juices.

6. A process of the character described comprising the steps of collecting the primary juices from sugar cane mills into one apparatus and there heat treating and decanting them, collecting the secondary juices from said mill into a secondary apparatus and there subjecting said secondary juices to a treatment to effect a quick precipitation, which treatment involves heating to a relatively high temperature and without decantation, quickly reducing the temperature of said secondary juices and delivering them with their precipitated and consolidated impurities back to and upon the bagasse mat at such a point that after said juices have been strained through said bagasse mat they join said primary juices to be decanted along with said primary juices all in a continuous operation.

FRANCIS RIVERS FORTIER.